United States Patent [19]
Bärwald et al.

[11] Patent Number: 5,696,582
[45] Date of Patent: Dec. 9, 1997

[54] APPARATUS FOR AND METHOD OF ANALYZING THE OPTICAL SPECTRUM OF A RADIATION INDEPENDENT OF THE PHASE POSITION

[76] Inventors: Wolfgang Bärwald, Leninallee 487, 1140 Berlin; Thomas Terzibaschian, Lindenallee 57, 1120 Berlin; Marita Wählisch, Herbert-Tschäpe-Strasse 58, 1165 Berlin, all of Germany

[21] Appl. No.: 470,333

[22] Filed: Jun. 6, 1995

Related U.S. Application Data

[63] Continuation-in-part of Ser. No. 392,391, Feb. 22, 1995, abandoned, which is a continuation of Ser. No. 232,394, Apr. 25, 1994, abandoned, which is a continuation of Ser. No. 971,184, Nov. 3, 1992, abandoned.

[30] Foreign Application Priority Data

Nov. 6, 1991 [DE] Germany .............. 41 36 536.4

[51] Int. Cl.⁶ .............................. G01B 9/62
[52] U.S. Cl. .............................. 356/346; 356/358
[58] Field of Search .............................. 356/346, 358

Primary Examiner—Frank G. Font
Assistant Examiner—Robert Kim
Attorney, Agent, or Firm—Cohen, Pontani, Lieberman & Pavane

[57] ABSTRACT

In a Fourier spectrometer arrangement for Fourier transforming an interferogram for determining the optic spectrum of a radiation, the readout of the interferogram is decoupled from particular phase positions of the reference signal through elimination of otherwise required synchronization with an external fixed clock pulse to thereby enable a lowering of the reference frequency and simultaneously to maintain or increase the scan frequency of the interferogram. The Fourier spectrometer arrangement includes an extrapolation filter which receives the incoming reference signal and employs adaptive state estimation processes in order to generate extrapolation values by which the future course of the reference signal can be projected. These extrapolation values can be calculated at times which are closer together than, e.g., zero crossings of the reference signal and may have an arbitrary phase position thereto. In this manner, the interferogram can be scanned at times which are independent of the phase position of the reference signal and, if necessary, at shorter intervals.

28 Claims, 2 Drawing Sheets

APPARATUS FOR AND METHOD OF ANALYZING THE OPTICAL SPECTRUM OF A RADIATION INDEPENDENT OF THE PHASE POSITION

CROSS-REFERENCES TO RELATED APPLICATIONS

This is a continuation-in-part of application Ser. No. 08/392,391, filed Feb. 22, 1995, now abandoned, which in turn is a continuation of application Ser. No. 08/232,394, filed Apr. 25, 1994, now abandoned, which in turn is a continuation of application Ser. No. 07/971,184, filed Nov. 3, 1992, now abandoned.

BACKGROUND OF THE INVENTION

The present invention refers to an apparatus for and method of analyzing the optical spectrum of a radiation, and in particular to a Fourier spectrometer arrangement for Fourier transforming an interferogram.

Registration of an interferogram is provided by an interferometer in which light from a source is split by a beam-splitter coated on its second surface with a material which makes it half transmitting and half reflecting to produce two beams which are reflected by suitable mirrors to a detector, with one mirror being movable. Subsequently, the two beams are reunited after traversing different paths with an optical path difference and interfere constructively or destructively with each other. The magnitude of the retardation depends on the position of the movable mirror. An interferogram represents the measured light intensity of interfering partial beams as a function of the optical path difference. Thus, the intensity of the reunited interfered beams changes in dependence on the spectral composition of the light beam being analyzed.

In order to produce the optical spectrum from these intensity fluctuations, the intensity of interfering partial beams has to be measured at precisely defined optical path differences of both beams.

In accordance with a conventional method for measuring the intensity of the beams based on the optical path difference, a monochromatic radiation is guided through the optic channel of the interferometer. In this context, various configurations of Fourier spectrometers are referred to, as described in the articles "Aufbau des Optikblocks des Infrarot-Fourier-Spektrometers FS ¼" by Dr. rer. nat. H. Becker-Roβ and Dipl.-Ing. W. Stadthaus, Feinger ätetechnik, Berlin 33, 1984, p. 341–344, and "Ein neues Interferometer für die Fourier-Spektroskopie" by Klaus K örner, Optik, vol. 68, No. 3, 1984, p. 217–223, and "Double pendulum Michelson interferometer with extended spectral resolution" by R. G. Jaacks and H. Rippel, Applied Optics, vol. 28, No. 1, 1989, p. 29 to 30. The interferometers disclosed in these publications generate interferograms of a reference radiation (monochromatic) and, at the same time, of an optical radiation being measured. The very sharply defined interference lines of this monochromatic radiation are used as a path scale in order to measure the interferogram at equidistant points with regard to the optical path difference. The equidistance is the basis for allowing application of numerical methods for calculating the spectrum from the scanned interferogram. Errors in the optical path difference at the scanning points may only be in the magnitude of approximately a twentieth of the shortest wavelength in the spectrum which is still detectable in order to enable a calculation of a sufficiently accurate spectrum.

Such an optical path measurement is accomplished in increments of $\lambda_{ref}/2$ (half wavelength of the reference radiation) since the bright/dark transitions of the interfered reference radiation during change of the optical path difference are evaluated.

From U.S. Pat. No. 4,413,908 it is known to square the reference signal, that is the initial signal of the detector for the interfered reference radiation, in order to half the increments. This method results, however, in a deterioration of the signal-to-noise ratio of the reference signal. Since the path measurement has to be precise, prior art methods used only particular phase positions of the reference signal, i.e. the zero crossings (0°, 180°, 360°...) or the zero crossings (or nulls) of the squared signal for triggering readout of the interferogram. The shortest path length which can be determined from the interferogram in the spectrum is thus limited.

All conventional methods operating with a monochromatic reference radiation or modifying the change of the optical path difference in spatial or periodic reference signals, e.g. through application of the moiré effect, have in common that the equidistant scanning of the interferogram is inflexibly linked to the periodicity of the utilized reference signal.

Since the scan frequency of the interferogram is determined by the respective measuring task to be solved by the spectrometer, a reference signal with respectively adapted periodicity has to be used. This may mean, however, that a monochromatic light source with a wavelength which is difficult to realize or broad-band light sources with monochromators must be employed. Such an arrangement results in a deterioration of the signal-to-noise ratio in the reference signal and significantly complicates the overall design for such a spectrometer.

Therefore, the rigid link between particular phase positions of the reference signal and the data points of the interferogram essentially prevents or at least greatly complicates the provision of a suitable reference source with required wavelength. For example, the necessary length of periodicity of the reference signal may be so small that generally available monochromators become unsuitable.

This necessary link or phase relationship between the length of periodicity of the reference signal and the uniform scanning of the interferogram of an optic measuring radiation is a common drawback of conventional spectrometers or interferometers.

In fast scanning spectrometers, the uniform modification of the optical path difference allows transformation of the periodic reference signal in the optical path difference into a time-dependent periodic signal which has a frequency proportional to the spatial frequency of the reference signal and to the change of speed of the path difference (mirror speed). For example, in the case of a Michelson interferometer with a movable mirror, the following equation is given:

$$f = 2 \cdot v \cdot W$$

wherein f is the reference frequency of the reference signal in 1/s, v is the speed of displacement of the mirror in m/s, and W is the wave number of the reference source in 1/m.

Thus, conventional methods allow a more delicate scanning of the interferogram of an optic measuring radiation only when increasing the frequency of the reference signal, resulting in an even higher demand with respect to the electronic system for processing a reference signal, in particular in regard to bandwidth and linearity of the phase-frequency characteristics of the detector and the amplifier.

Fast scanning spectrometers utilize the directly proportional relationship between frequency of the reference signal and speed of change of the optical path difference in order, on the one hand, to maintain a constant control speed within given limits which is a necessary condition to generate the error-free spectrum from the scanned interferogram. U.S. Pat. No. 4,413,908 discloses such a method and an arrangement for keeping constant the speed of the mirror. On the other hand, prior art methods propose to accomplish this control with a phase-lock loop (PLL) as phase detector and subsequent control of the detected phase error with regard to a fixed, usually quartz-stabilized frequency of a clock pulse generator. Such a method is also disclosed in the article "Nimbus 4 Michelson Interferometer" by R. A. Hanel et al, Applied Optics, vol. 10, no. 6, 1971. This is disadvantageous because it requires not only an equidistant scanning of the interferogram in dependence of the path difference but also a synchronization with an external clock pulse. Therefore, the control system becomes greatly complicated because instead of a simple speed control of the mirror a positional control (phase difference between reference signal and fixed clock pulse) must be carried out.

It is further known to infer from past events to future events of an essentially continuous process by utilizing appropriate calculating methods or mathematical abstraction models in order to predict the outcome through extrapolation. Such models are referred to as an extrapolation filter. U.S. Pat. No. 5,218,553 discloses an extrapolation filter in the form of a Kalman filter in order to determine the concentration of known elements in unknown chemical samples. The article "Optimale Regelung zeitkontinuierlicher stochastischer Objekte bei zeitdiskreter Beobachtung" by Norbert Ahlbehrendt and Karl-Heinz Schmelovsky, Elektronische Informationsverarbeitung und Kybernetik, 1979, p. 455–474 describes the use of a Kalman filter or Kalman-Bucy filter for similar control tasks.

SUMMARY OF THE INVENTION

It is an object of the present invention to provide an improved Fourier spectrometer arrangement obviating the afore-stated drawbacks.

In particular, it is an object of the present invention to provide an improved Fourier spectrometer arrangement by which an interferogram can be randomly and more frequently read out within a full period of the reference signal and by which an optimal control of speed of the mirror is attained with regard to a change of the optical path difference.

It is yet another object of the present invention to provide an improved Fourier spectrometer arrangement which is not restricted by any given limitations with regard to the relationship between period length of the scanning and reference signal so as to allow a lowering of the reference frequency and, at the same time, to maintain or to increase the scan frequency of the interferogram of an optic measuring radiation.

It is still another object of the present invention to provide an improved method of operating a spectrometer.

These objects and others which will become apparent hereinafter are attained in accordance with the present invention by providing at least one motor-driven mirror, a detector for converting a reference signal of the interfered reference beam to a cosine detector signal, a control unit which includes a first electronic componentry for successive determination of zero crossings or nulls of the detector signal and for converting the detector signal into a frequency signal which is proportional to a momentary speed or velocity of the mirror, an extrapolation unit for determining the estimated speed of the mirror at a predetermined moment and for formation of a frequency signal proportional to the extrapolated speed, and a second electronic componentry for formation of a trigger signal for reading the interferogram of the measuring beam.

In accordance with the teachings of the present invention, the readout of the interferogram is de-linked from particular phase positions of the reference signal by eliminating synchronization otherwise required with an external (quartz-) controlled fixed clock pulse. In addition, the present invention utilizes methods of adaptive state estimation, with suitable control based upon this adaptive state estimation.

An essential feature of the present invention is the use of an extrapolation unit with an extrapolation filter, with the common reference signals received by the input of the extrapolation filter. Suitably, the extrapolation filter may have a further input which is operatively connected with the control signal of the drive unit by which the movable mirror of the interferometer is shifted and thus the optical path difference is modified.

Persons skilled in the art will understand that instead of or in addition to the signals for the motor control, preferably a signal proportional to the motor current, and possibly also to other disturbance variables as a signal, may be applied to or imposed on the extrapolation unit. Of interest are disturbance variables such as temperature or acceleration forces in interferometers in space vehicles which may falsify the interferogram.

The extrapolation filter processes the incoming signals in accordance with conventional estimation methods, i.e. the extrapolation means generates from these signals extrapolation values for the future course of the reference signal. These values can now be calculated for instants in time which lie closer together than, e.g. zero crossings of the reference signal and which may have an arbitrary phase position relative thereto.

Scaling of the reference frequency in the extrapolation means is dependent only on the accuracy of the detection of the reference signal and on the degree of compatibility between the selected model of the extrapolation filter and the actual system. It has been surprisingly found that the determination of the scanning points from the reference signal is independent of the phase position thereof and significantly more distinct by using the extrapolation filter.

In accordance with the present invention, the extrapolation filter has at least one input and an output and operates in such a manner that at least a value commensurate with the momentary optical path difference can be formed from the incoming reference signals and possibly other signals. It may also be feasible to use the extrapolation filter for generating values commensurate with differentiations with respect to time of the optical path difference of random order such as speed or velocity, acceleration etc. By means of such a filtering, i.e. estimation, it is possible to extrapolate and project prior to arrival of the next measuring signal, e.g. the next zero crossing, the time gradient of the optical path difference until this signal arrives. In this manner, it is possible to randomly determine the moment in which a desired phase position of the reference signal and thus a specific change of the optical path difference will exist.

The signal obtained at the output of the extrapolation means can then be used for triggering the readout of the interferogram of the optical measuring radiation in a manner generally known per se. However, in contrast to conventional methods, the present invention does not require the PLL-implemented synchronization between a highly accurate fixed clock pulse and the frequency of the reference signal because the measuring principle of a Fourier spectrometer requires only a constant speed by which the movable mirror is shifted. The obtained drift of the phase position of the reference signal, relative to an imaginary fixed clock pulse, results only in a low frequency influence of the scanned interferogram outside the measuring range, which, however, is insignificant.

The present invention thus eliminates the necessity of a synchronization of the reference clock pulse and the fixed clock pulse and the limitations with regard to readout times. The significantly more sensitive scanning of the interferogram allows its use for a wider range of the spectrum being analyzed. It is not necessary to numerically relate the periodic length of the scanning and the reference signal. Thus, the scan frequency of the interferogram can be maintained or increased while lowering the reference frequency.

The trigger signal transmitted by the extrapolation means contains information about the position and the speed of the mirror drive for a future moment so that this signal can be utilized in a subsequent structural component or subsequent control algorithm for controlling the synchronism of the drive. It is not necessary to provide a continuous speed control; rather a random speed can be preset. Suitably, the estimation method is accomplished by means of a microprocessor. It is, however, also possible to attain the estimation algorithm as an analogue control by employing suitable hardware.

The extrapolation means or state predictor, e.g. a Kalman filter, operates at a fixed given clock pulse and allows calculation of the most probable system status at predetermined moments within the cycle. The adaptive state estimation employed for the determination or assignment of scanning moments to the position eliminates the need for a rigid link of the control clock pulse with the moments of zero crossings of the reference signal. For example, at constant change of speed of the optical path length, the time period between successive zero crossings may be a multiple of the control clock pulse during which the scanning of the interferogram takes place.

The manner in which the optical path difference is provided or generated affects only the making of the extrapolation filter or Kalman filter.

In accordance with an aspect of the invention, in a Fourier spectrometer arrangement for determining the optical spectrum of a radiation by splitting a beam of the radiation into two beams having a path length difference therebetween and reuniting the two beams so as to form an optical interferogram and by Fourier transformation of the optical interferogram, based upon a reference interferogram derived from a reference beam, wherein the reference beam is split into two component beams having a path length difference therebetween and the two component beams are reunited so as to form the reference interferogram, the spectrometer arrangement comprises an interferometer including at least one motor-driven mirror arrangement for varying the path length difference; a detector, responsive to the reference interferogram, for deriving a cosine detector signal representative of the reference interferogram; a control unit coupled to the detector, wherein the control unit comprises a first electronic unit for successive determination of zeros of the cosine detector signal and for deriving a first frequency signal which is proportional to an instantaneous velocity of the mirror arrangement; an extrapolation apparatus coupled to receive the first frequency signal for determining the instantaneous velocity of the mirror at a predetermined moment, for deriving an extrapolated velocity and for formation of a second frequency signal proportional to the extrapolated velocity; and a second electronic unit for utilizing the second frequency signal for forming a trigger signal for reading the optical interferogram.

In accordance with another aspect of the invention, the extrapolation apparatus comprises extrapolation filter apparatus.

In accordance with another aspect of the invention, the extrapolation apparatus comprises Kalman filtering apparatus.

In accordance with still another aspect of the invention, the spectrometer arrangement further comprises applying apparatus for applying disturbance variables to the control unit.

In accordance with still another aspect of the invention, the applying apparatus applies to the control unit a signal proportional to an instantaneous value of drive current in the motor-driven arrangement.

In accordance with a still further aspect of the invention, the reference beam is substantially monochromatic.

In accordance with yet a further aspect of the invention, the first control unit includes a comparator operatively connected to the detector for detecting the zeros and triggering a corresponding time signal; and a digital counter for receiving the time signal and providing an interval signal representative of the elapsed interval between two successive time signals and for converting the interval signal into a velocity value.

In accordance with an aspect of the invention, a method of operating a Fourier spectrometer, in particular a fast scanning Fourier spectrometer having a movable mirror, for analyzing an optic measuring radiation, comprises the steps of: producing a first interferogram of the measuring radiation; producing a second interferogram of a reference radiation having a given periodicity; and measuring components of the first interferogram relative to the given periodicity of the second interferogram, wherein the measuring step comprises: deriving from the second interferogram a reference signal; deriving from the reference signal an extrapolated velocity signal; and utilizing the extrapolated velocity signal for undertaking measurements on the first interferogram at intervals smaller than a full period of the reference signal.

In accordance with still another aspect of the invention, the reference radiation is substantially monocromatic.

In accordance with still a further aspect of the invention, the reference radiation is spectrally of a random wavelength in relation to the optic measuring radiation.

In accordance with yet a further aspect of the invention, the step of deriving a reference signal comprises detecting zeros of the second interferogram.

In accordance with yet a further aspect of the invention, the step of deriving a reference signal comprises detecting every other zero of the second interferogram.

In accordance with yet a further aspect of the invention, the step of deriving from the reference signal an extrapolated velocity signal comprises using a Kalman filter for extrapolation.

In accordance with yet a further aspect of the invention, a plurality of the measurements are undertaken within the full period.

BRIEF DESCRIPTION OF THE DRAWING

The above and other objects, features and advantages of the present invention will now be described in more detail with reference to the accompanying drawing in which.

DETAILED DESCRIPTION OF A PREFERRED EMBODIMENT

Figure 1:
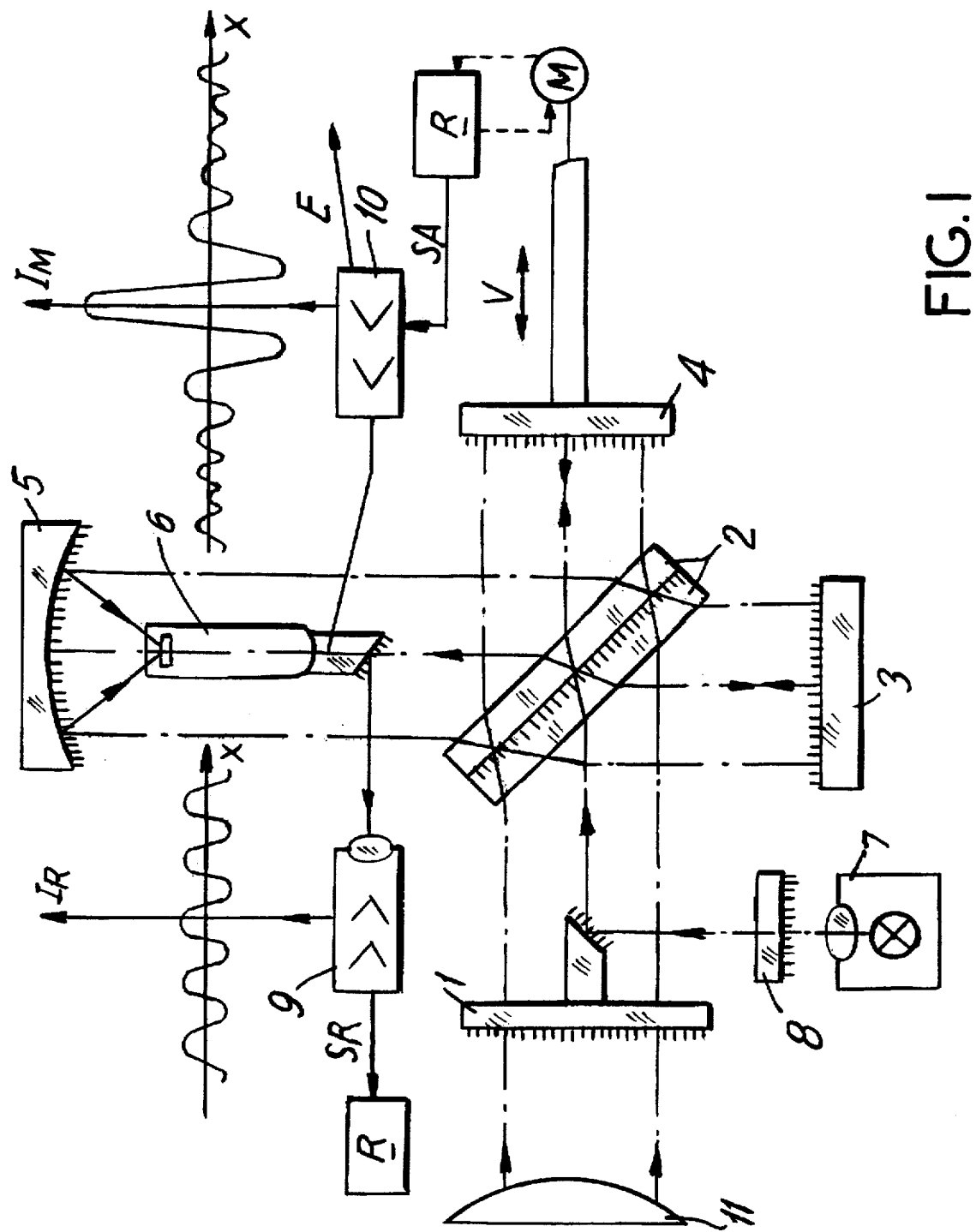
FIG. 1 is a schematic overall illustration of one embodiment of a Fourier spectrometer arrangement in accordance with the present invention.

Referring now to the drawing and in particular to FIG. 1, there is shown a schematic overall illustration of one embodiment of a Fourier spectrometer arrangement in accordance with the present invention. The Fourier spectrometer arrangement includes an exemplary interferometer which includes a fixed mirror 3 and a movable mirror 4 driven by a suitable motor M. The path of motion along which the mirror 4 is shiftable is indicated by arrow V. Light emitted from the sources 11, 7 strikes a beamsplitter 2 which is coated on its second surface with a material to make it half transmitting and half reflecting so as to split the light into two beams. After being reflected by the mirrors, 3, 4, the partial beams are united in order to produce the interferogram I(x) by generating a signal which is dependent on the optical path difference x of both partial beams, with the optical path difference x corresponding to twice the difference between the distances of the fixed mirror 3 and the movable mirror 4 from the beamsplitter 2. At measurement, the optical path difference x is varied by the movement of the mirror 4.

The limits of the measuring range are determined by the wave number dependent transmission of the filter 1 of the measuring light source 11. The correlation between the measured interferogram I(x) and the searched-for spectrum is yielded by the Fourier transformation through numerical calculation of the Fourier integral within the limits of the optical path difference between $x_{min}$ and $x_{max}$, with the spectral resolution being dependent on the maximum path difference in the interferogram. In order to calculate the beam densities from the interferogram, the exact path differences x are to be determined in addition to the intensity values. This is done by the central reference beam in the interferogram with the quasi-monochromatic radiation of the light source 7 being modulated by interference with wave filter 8 analogous to the measuring radiation and received via the tilted mirror on the bolometer 6 in the photodetector 9, amplified and a cosine signal SR is generated whose zero crossings serve as exact path marks (interferogram $I_R$).

This reference signal SR is transmitted at the same time to a control unit R. After passing the beamsplitter 2, the partial beams of the measuring light source 11 are concentrated via a collimator mirror 5 in the bolometer 6 and transmitted to the measuring signal receiver and amplifier 10 for generation of the interferogram $I_M$.

The receiver 10 is supplied with an output signal SA from the control unit R which is also operatively connected with other, e.g. the illustrated motor M for the mirror 4. The result E gained through Fourier transformation is utilized for illustration of the spectrum of the measuring light.

Persons skilled in the art will understand that the illustration of the interferometer in FIG. 1 is done by way of example only and for illustrative purposes only in order to facilitate understanding of the present invention which thus should not be limited thereto.

Figure 2:
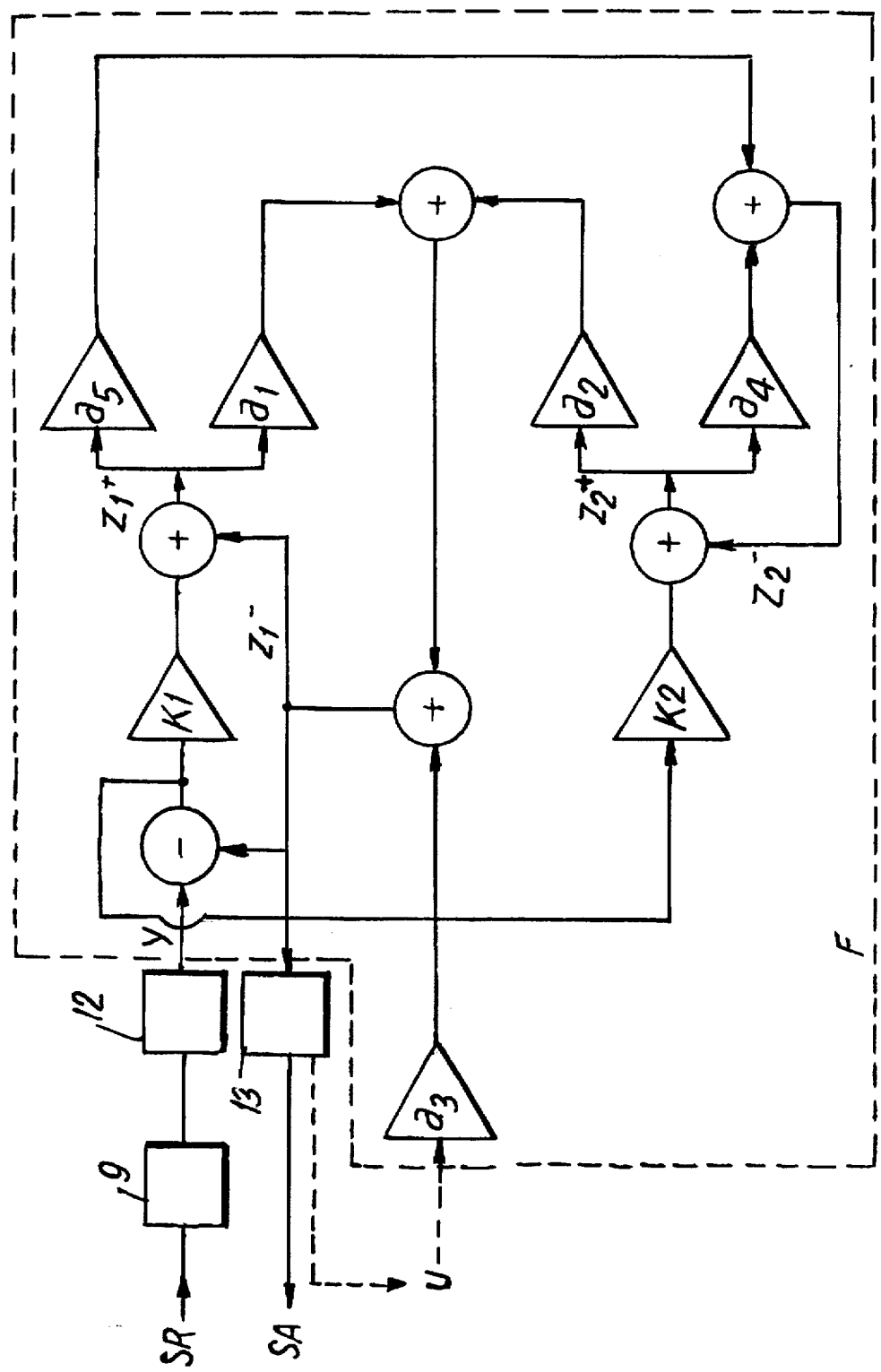
FIG. 2 is a schematic illustration of a control unit with an extrapolation means for use in a Fourier spectrometer arrangement in accordance with the present invention, symbolically illustrating in detail the mathematical operations performed by the extrapolation means.

FIG. 2 shows the control unit with electronic componentries 12 and 13 as well as the extrapolation filter unit F with the Kalman filter, illustrated here by amplifiers K1 and K2. The detector 9 has an input which receives the reference signal $S_R$. Operatively connected to the detector 9 is an electronic componentry, generally designated by reference numeral 12 and including a comparator which detects every second zero crossing. Each time the comparator registers the respective zero crossing a signal is transmitted to a digital counter which determines the interval passed between two successively incoming signals from the comparator to form a corresponding time value. This time value is then converted into a speed value y which is stored in a register of a not shown microprocessor until being retrieved for further processing.

Operatively connected to the electronic componentry 12 is a status predictor or extrapolation means F which has one input receiving the speed value y stored in the register and a second optimum input receiving, for example, a drive signal u commensurate with the drive current of the motor M for the movable mirror 4 of the interferometer.

In the nonlimiting example of FIG. 2, the extrapolation means F is designed as a Kalman filter which unites several functions. By means of the incoming input signal (actual speed value), the extrapolation means F carries out a state estimation for the parameters of speed and acceleration of the optical path difference variation. Based on these values, its further movement is extrapolated. These extrapolations are used for calculating the new drive current of the motor M as well as for calculating the speed resulting from the time in which a particular optical path difference is generated. Thus, the filter means utilizes the actual speed value for projecting the next most suitable scanning moment for the interferogram whereby this moment lies within two zero crossings of the reference signal $S_R$.

The present invention utilizes status predictors in the form of a Kalman filter to project the future course of relevant process variables or of the overall process behavior in order to allow proper manipulations of certain operations. Known estimation methods use an algorithm for calculating the future course (time gradient) of the state variable being monitored. Based on the calculated time gradient, a determination is made as to whether or not a given limit value is exceeded. The determination of the time gradient is attained by using a certain number of actual measuring values of the process which are designated by the notation $y^m$.

For example, in the case of a revolving reflector interferometer, the estimation equations are given by:

$$Z_1^+ = Z_1^- + K_1(y^m - Z_1^-) \quad (1)$$

$$Z_2^+ = Z_2^- + K_2(y^m - Z_1^-) \quad (2)$$

wherein $Z_1^{+/-}$ is speed, $Z_2^{+/-}$ is acceleration, $K_1$ and $K_2$ are Kalman factors which weight the measuring value $y^m$ and the predicted extrapolated measuring value $Z_{1,2}^-$ with regard to accuracy. As hardware, K1 and K2 are formed as adjustable or system-adapted amplifiers which are suited to environmental influences, e.g. type of motor (linear motor, swivel motor) and other disturbances such as manufacturing tolerances. This enables construction of the control unit independent of the spectrometer. The systems can thus be made simultaneously, resulting in a significant shortening of production time.

Synchronism of the interferometer drive is advantageously accomplished by using the estimated state variable $Z_1^+$ and $Z_2^+$ with an optimized control, i.e. optimized with regard to the shortest time being required for attaining the desired state in accordance with the following control activities:

$$U = C_3(Z_1^{desired} - Z_1^+ C_1 + C_2 Z_2^+) \quad (3)$$

wherein

U is the motor current $C_i$ are constants.

After output of the control activity, the extrapolation is carried out up to the next moment of the measuring value inquiry (formation of the control clock pulse) in accordance with the estimation equations:

$$Z_1^- = Z_1^+ a_1 + Z_2^+ a_2 + U a_3 \quad (4)$$

$$Z_2^- = Z_1^+ a_4 + Z_2^+ a_5 \quad (5)$$

wherein $a_1$, $a_2$, $a_3$, $a_4$ and $a_5$ are constants representing the duration of one control clock pulse. As hardware, the constants $a_1$ to $a_5$ are designed as amplifiers with varying degrees of amplification. The degree of amplification considers the weighting of the respective signal being amplified within the filter.

For example, the duration of a control cycle of the control unit amounts to 1/2.5 kHz, i.e. 400 μsec. If it is desired to read out the interferogram at equidistant positions, the moment of scanning can be determined with the extrapolation values as follows:

$$\Delta t = \Delta OPD / Z_1^- = \lambda / n \; 1/(Z_1^+ a_1 + Z_2^+ a_2 + U a_3) \quad (6)$$

wherein

OPD stands for Optical Path Difference.

The number n represents the frequency of the readout of the interferogram within a reference wavelength. Since the calculation of the equations requires a finite time $t_R$ which has to be smaller than the time between two intended readouts of the interferogram i.e. $\Delta t_R < \Delta t/n$, it is possible to optimize the respective hardware. In accordance with an exemplified embodiment, $\Delta t_R < \Delta t/4$, which means that a readout of the interferogram is possible after a phase difference of $\lambda/4$. In order to achieve such a readout rate with conventional methods, a theoretical reference signal of $\lambda = 0.16$ μm is required. The generated extrapolated speed signal $Z_1^-$ is converted in an electronic componentry 13, which is a functional mirror image of the electronic componentry 12 to a trigger signal $S_A$ for reading out the interferogram $I_M$ of the measuring radiation. At a same time, this signal can be used, e.g. for control of the motor M.

The present invention carries out a speed control, e.g. for the revolving direct drive of an interferometer with high precision. The control method uses stochastic processes, with the Kalman filter being utilized for determining and predicting the control activity which is calculated in dependence on a preceding estimation of the status of the motor drive which is also carried out by the Kalman filter. The functional dependence of the control activity from the momentary status is arrived at through evaluation of suitable algorithms.

Persons skilled in the art will understand that the present invention should not be limited to the use of revolving reflector interferometers but is applicable for all types of Fourier spectrometers such as, e.g., Michelson interferometers or pendulum interferometers.

While the invention has been illustrated and described as embodied in an apparatus for and method of analyzing the optical spectrum of a radiation, it is not intended to be limited to the details shown since various modifications and structural changes may be made without departing in any way from the spirit of the present invention.

We claim:

1. A Fourier spectrometer arrangement for determining an optical spectrum of a radiation by Fourier transforming an optical interferogram based on a reference interferogram produced by splitting a reference beam into two beams having a path length difference therebetween and reuniting the beams to form the reference interferogram, said spectrometer arrangement comprising an interferometer including:

at least one motor-driven mirror;

a detector for converting a reference signal derived from the reference interferogram into a cosine detector signal; and a control unit comprising:

a first electronic control unit for successively determining zero crossings of the detector signal and converting the detector signal to a frequency signal proportional to an instantaneous speed of the motor-driven mirror;

an extrapolation means for determining an estimated speed of the mirror at a predetermined moment and for forming a frequency signal proportional to the estimated speed; and a second electronic control unit for forming a trigger signal, independent of particular phase positions of the reference signal, for reading the optical interferogram.

2. A Fourier spectrometer arrangement as defined in claim 1, wherein said control unit comprises:

a comparator operatively connected to said detector for detecting the zero crossings of the reference signal and triggering a corresponding time signal; and a digital counter for receiving the time signal and providing an interval signal representing an interval between two successive time signals and converting the interval signal into a velocity value.

3. A Fourier spectrometer arrangement as defined in claim 1, wherein said extrapolation means includes an extrapolation filter.

4. A Fourier spectrometer arrangement as defined in claim 3, wherein the extrapolation filter is a Kalman filter.

5. A Fourier spectrometer arrangement as defined in claim 1, further comprising means for imposing disturbance variables on said control unit.

6. A Fourier spectrometer arrangement as defined in claim 5, wherein said imposing means imposes a signal proportional to an instantaneous motor current on said control unit.

7. A method of operating a Fourier spectrometer for analyzing an optic measuring radiation using an interferogram of the measuring radiation measured relative to a given periodicity of an interferogram of a reference radiation, said method comprising the steps of:

deriving a reference signal exhibiting nulls representative of the periodicity of the interferogram of the reference radiation;

deriving a signal representative of a time separation interval between the nulls; and utilizing extrapolation means for enabling measurement of the interferogram of the measuring radiation at instants in time intermediate the nulls whereby the instants are enabled to be closer together than a period of the interferogram of the reference radiation.

8. A method as defined in claim 7, further comprising the steps of:
   determining extrapolation values representing a time gradient of the reference signal using an extrapolation filter; and
   calculating predetermined moments for readout of the interferogram of the measuring radiation, wherein the moments are closer together than successive zero crossings of the reference signal and independent of particular phase positions of the reference signal.

9. A method as defined in claim 8, wherein the extrapolation filter is a Kalman filter.

10. A method as defined in claim 8, further comprising the steps of forming a value commensurate with a momentary optical path difference using the extrapolation filter and utilizing this value for drive control.

11. A method as defined in claim 8, further comprising the step of outputting from the extrapolation filter an output signal commensurate with the time gradient of the optical path difference from triggering readout of the interferogram of the measuring radiation.

12. A method as defined in claim 8, wherein the extrapolation filter represents the following estimation equations $$Z_1^+ = Z_1^- + K^1(y^m - Z_1^-)$$

$$Z_2^+ = Z_2^- + K^2(y^m - Z_1^-)$$

wherein $Z_1^{+/-}$ is speed, $Z_2^{+/-}$ is acceleration, and $K_1$ and $K_2$ are Kalman factors which weight a measuring value $y^m$ and a predicted extrapolated measuring value $Z_{1,2}^-$ with regard to accuracy.

13. A method as defined in claim 7, and further comprising the step of providing a control of synchronism of the interferogram drive through output of the control activity $$U = C_3(Z_1^{desired} - Z_1^+ + C_1 + C_2 Z_2^+)$$

and after output of the control activity extrapolating up to the next moment of the measuring value inquiry in accordance with the estimation equations $$Z_1^- = Z_1^+ a_1 + Z_2^+ a_2 + U_{a3}$$

$$Z_2^- = Z_1^+ a_4 + Z_2^+ a_5$$

wherein

U is the motor current, $C_i$ are constants, $Z_1^{desired}$ is the desired state variable, $Z_1^{+/-}$ is speed, $Z_2^{+/-}$ is acceleration, and a1, a2, a3, a4 and a5 are constants representing the duration of a control cycle.

14. A Fourier spectrometer arrangement for determining an optical spectrum of a radiation by Fourier transforming an optical interferogram based on a reference interferogram produced by splitting a reference beam into two beams having a path length difference therebetween and reuniting the beams to form the reference interferogram, said spectrometer arrangement comprising an interferometer including:
   at least one motor-driven mirror arrangement for varying the path length difference;
   a detector for deriving a cosine detector signal from a reference signal representative of the reference interferogram;
   a control unit coupled to said detector and comprising:
      a first electronic unit for successively determining zeros of the cosine detector signal and deriving a first frequency signal which is proportional to an instantaneous velocity of the mirror arrangement;
      an extrapolation means coupled to receive the first frequency signal for determining the instantaneous velocity of the mirror at a predetermined moment, deriving an extrapolated velocity and forming a second frequency signal proportional to the extrapolated velocity; and
      a second electronic unit for utilizing the second frequency signal and forming a trigger signal, independent of particular phase positions of the reference signal, for reading the optical interferogram.

15. A Fourier spectrometer arrangement as defined in claim 14, wherein said extrapolation means comprises extrapolation filtering means.

16. A Fourier spectrometer arrangement as defined in claim 14, wherein the extrapolation filtering means is a Kalman filtering means.

17. A Fourier spectrometer arrangement as defined in claim 16, further comprising means for applying disturbance variables to said control unit.

18. A Fourier spectrometer arrangement as defined in claim 17, wherein said applying means applies a signal proportional to an instantaneous value of drive current in said motor-driven mirror arrangement to said control unit.

19. A Fourier spectrometer arrangement as defined in claim 17, wherein said reference beam is substantially monochromatic.

20. A Fourier spectrometer arrangement as defined in claim 14, wherein said control unit comprises:
   a comparator operatively connected to said detector for detecting the zero crossings and triggering a corresponding time signal; and
   a digital counter for receiving the time signal and providing an interval signal representing an interval between two successive time signals and converting the interval signal into a velocity value.

21. A method of operating a Fourier spectrometer for analyzing an optic measuring radiation comprising the steps of:
   producing a first interferogram of the measuring radiation;
   producing a second interferogram of a reference radiation having a given periodicity;
   measuring components of said first interferogram relative to the given periodicity of said second interferogram, wherein said measuring step comprises the steps of:
   deriving from said second interferogram a reference signal;
   deriving from the reference signal an extrapolated velocity signal; and
   utilizing the extrapolated velocity signal to perform measurements on said first interferogram at intervals smaller than a full period of the reference signal.

22. The method of operating a Fourier spectrometer in claim 21, wherein the reference radiation is substantially monochromatic.

23. The method of operating a Fourier spectrometer in claim 22, wherein the reference radiation is spectrally of a random wavelength relative to the optic measuring radiation.

24. The method of operating a Fourier spectrometer in claim 21, wherein said step of deriving the reference signal comprises detecting zero crossings of said second interferogram.

25. The method of operating a Fourier spectrometer in claim 21, wherein said step of deriving the reference signal comprises detecting every other zero crossing of said second interferogram.

26. The method of operating a Fourier spectrometer in claim 21, wherein said step of deriving from said reference signal the extrapolated velocity signal comprises using a Kalman filter for extrapolation.

27. The method of operating a Fourier spectrometer in claim 21, wherein a plurality of measurements are performed within the full period.

28. A Fourier spectrometer arrangement for Fourier transforming an optical interferogram for determining an optic spectrum of a radiation based on a reference signal, wherein readout of the optical interferogram is decoupled from particular phase positions of the reference signal without need of synchronization with an external fixed clock pulse thereby enabling a lower frequency to be utilized while simultaneously one of maintaining and increasing scanning frequencies of the optical interferogram, said Fourier spectrometer arrangement comprising:

an extrapolation filter receiving the reference signal and generating extrapolation values by which a time gradient of the reference signal is projected using and adaptive state estimation process, wherein the extrapolation values are calculated at moments which are closer together than zero crossings of the reference signal and at phase positions independent of the zero crossings; and means coupled to said extrapolation filter for scanning the optical interferogram at least one of moments independent of particular phase positions of the reference signal and moments closer together than the zero crossings of the reference signal while simultaneously independent of the zero crossings.

* * * * *